INVENTOR.
LAURENCE H. FLORA
ATTORNEYS

March 25, 1969 L. H. FLORA 3,434,521
PLASTIC FASTENER WITH CURVED ENTRY SHOULDER IN BORE
Filed Aug. 2, 1965

INVENTOR.
LAURENCE H. FLORA
BY
Jeare, Jetzer & Jeare
ATTORNEYS

United States Patent Office 3,434,521
Patented Mar. 25, 1969

3,434,521
PLASTIC FASTENER WITH CURVED ENTRY
SHOULDER IN BORE
Laurence H. Flora, North Olmsted, Ohio, assignor to
Tinnerman Products, Inc., Cleveland, Ohio, a corporation of Ohio
Filed Aug. 2, 1965, Ser. No. 476,306
Int. Cl. F16b 39/00
U.S. Cl. 151—41.73    3 Claims This invention relates to fastening devices, and more particularly relates to a novel polymeric fastening device of the plug insert and/or nut type for use in joining structural parts by means of bolts, screws or the like.

In the past, considerable difficulty has been encountered in the securement of fasteners, such as bolts, screws or the like, in relatively soft materials, particularly in wood or other soft fiber materials. Among such difficulties has been the inability to thread such materials to provide a tight fitted engagement between the parts. The absence of such tight fitted engagement has resulted in frequent loosening and/or dislodgment of the parts after assembly. Moreover, such materials have made repeated installation of the fasteners in a given location highly impractical, particularly in blind locations where access for installation is available from only one side of the work.

Heretofore, various fastening devices of the plug insert and/or nut type have been employed for the above purposes, but have not been completely satisfactory. Such prior fasteners have generally been made from metallic materials which have been provided with an axial threaded bore for threaded securement with the end of a bolt, screw or the like. Such arrangements or devices are not only expensive to produce, but are readily susceptible to stripping of the threads when a high torque requirement is dictated, particularly in blind locations which makes accurate axial threading extremely difficult.

Accordingly, an object of the present invention is to provide a novel polymeric plug insert and/or nut type fastening device which is of a simple, yet rugged, inexpensive construction, and which effectively overcomes the aforementioned difficulties and other related defects and disadvantages encountered in the securement of bolts, screws or the like, to relatively soft materials.

Another object of the present invention is to provide a fastening device of the character described which may be quickly and easily inserted into an aperture in relatively soft materials for retaining bolts, screws or the like, and which prevents rotational and/or axial loosening of the parts.

A further object of the present invention is to provide a fastening device of the character described constructed and arranged to provide high torque requirements in the securement of bolts, screws or the like, which obviates the necessity of conventional threading or the like, and which enables ready disconnection of the bolts, screws or the like, with a minimum of effort and without the need for special tools or equipment.

Other features, objects and advantages of the present invention will be apparent from the following description of preferred embodiments illustrated in the accompanying drawings in which.

In general, the present invention provides a novel construction of a polymeric fastening device of the plug insert and/or nut type which may be inserted in an apertured support member for mounting a panel or the like by means of a threaded element, such as by bolts, screws or the like. The device in one form is preferably made from a polymeric material, such as polycarbonate or the like, and includes a headed body having an axial bore which extends from one end thereof. The bore is constructed to provide a novel land and channel arrangement which provides ready "self-threading" interlocking threading engagement with a threaded element for positive assembly of the parts, and which provides a novel relief means to enable the threaded element to be "backed-off" from such self-threading engagement for facile detachment of the parts.

In another form, the device is preferably made from a polymeric material, such as nylon or the like, and includes a headed body having an axial bore of continuous uniform diameter therein which provides ready "self-threading" interlocking coacting engagement with a threaded element for positive assembly of the parts, and which enables the threaded element to be "backed-off" from such threaded engagement for facile detachment of the parts.

In the embodiments shown, the exterior of the device is provided with an improved flute or ribbed construction which acts as a reinforcement for the body of the device, which facilitates insertion of the device into an apertured support member, and which prevents rotational movement of the device relative to the support member.

Figure 1:
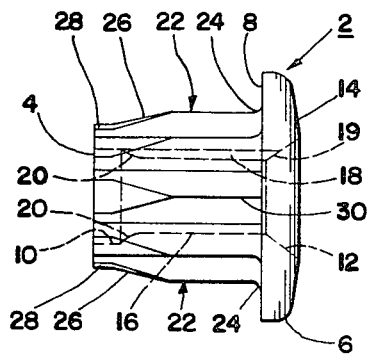
FIG. 1 is a side elevation view of one form of the fastening device made in accordance with the present invention.
Figure 2:
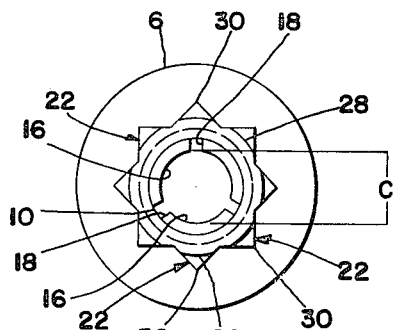
FIG. 2 is an end view looking from the left-hand side of the fastening device shown in FIG. 1.
Figure 3:
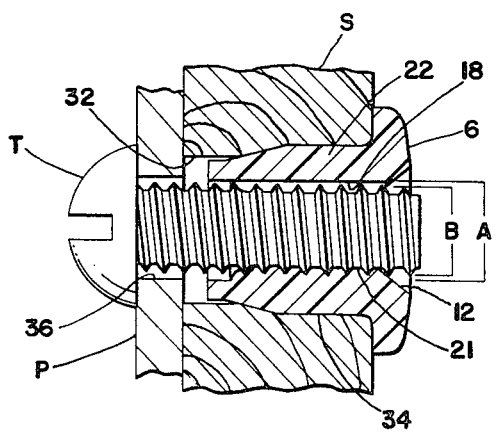
FIG. 3 is a fragmentary section view showing a typical assembly of the fastening device shown in FIGS. 1 and 2 for mounting an apertured panel or the like on a support structure.

Referring now again to the drawings, and in particular to FIGS. 1 to 3 thereof, the fastening device, designated generally at 2, is shown capable for use in the securement to a threaded element T for mounting an apertured panel P to a support structure S comprised of a relatively soft material, such as wood or the like. Preferably, the device 2 is made from a polymeric material, such as polycarbonate or the like, which may be economically produced for quantity mass production by conventional molding, extrusion or other forming methods, as are known in the art.

In the embodiments shown, the device 2 comprises a continuous cylindrical body 4 having an annular flange or head 6 provided adjacent one end thereof. The head 6 is preferably planar or flat on its under side, as at 8, so that the head may be seated flush with the confronting surface of the support structure S to which it may be applied. An axial bore 10 extends through the body 4 and into a tapered countersunk portion 12 which opens onto the face 14 of the head 6. The diameter A of the bore 10 is preferably slightly greater than the pitch diameter B of the threaded element T, such as a bolt, screw or the like, which is adapted to be inserted through the bore 10.

In accordance with the invention, the interior peripheral surface of the bore 10 is provided with a plurality of integral, axially extending and circumferentially spaced arcuate lands 16 which define therebetween a corresponding number of axially extending and circumferentially and spaced channels 18. As shown, the lands 16 are spaced inwardly or in axial spaced relationship from the end of the body 4 remote from the head 6 by an amount sufficient to facilitate initial insertion of the threaded element T therein. The lands 16 commence with smooth, curved shoulder portions 20 and terminate substantially at the juncture of the body 4 with the head 6 so that the channels 18 defined therebetween open onto the tapered face, as at 19, of the countersunk portion 12.

As best shown in FIG. 2, the lands 16 project radially inwardly from the surface of the bore 10 by an amount sufficient to provide an effective self-threading and gripping action upon insertion of the threaded element T therethrough. Moreover, it is preferred that the diameter C of a circle circumscribed by the outer surfaces of the respective lands 16 be substantially less than the pitch diameter B of the threaded element T so as to provide an effective self-threading engagement, as at 21, upon insertion of the threaded element T through the bore 10, as best seen in FIG. 3.

The channels 18 defined by the lands 16 are preferably of a polygonal, such as rectangular or square shaped configuration, in transverse cross section, but may be of any other suitable configuration in accordance with the present invention. In the embodiment shown, the channels 18 are of a depth sufficient to extend onto the confronting inner surface of the bore 10. Moreover, the depth of the channels 18, in the embodiment shown, substantially approximates the height or relative thickness of the lands 16. It is to be understood, that the relative height or extent of radial projection of the lands 16 as well as the depth of the channels 18 may vary depedent, for instance, upon the torque requirements for a particular application of the device. Thus an increased gripping action upon the threaded element may also be achieved by decreasing the depth of the channels 18 while keeping the height or extent of radial projection of the lands 16 relatively constant. Accordingly, the minimum and maximum channel depth may vary from zero or a no channel depth to a point where the channel depth is sufficient to extend onto the inner surface of the bore 10, as aforesaid.

It will be seen that such axially extending, circumferentially spaced land and channel arrangement provides a dual function in the securement of a threaded element to relatively soft structural materials. Thus, the device provides optimum torque requirements for retaining a threaded element in assembled relationship while at the same time enabling the element to be "backed-off" from self-threading engagement for ready removability therefrom.

The ability to detach a threaded element from the fastening device is particularly important when the device is made from materials, such as Lexan, which is a thermoplastic polycarbonate material. Such materials exhibit an unusual combination of good physical properties including exceptional dimensional stability, high heat resistance and high impact strength. The uniform superior toughness of such materials over a wide temperature range contributes to the usefulness for a wide variety of applications. In the present invention, it has been found that such materials hold threaded elements, such as bolts, screws or the like, tenaciously making detachment from the threaded element extremely difficult, if not in some instances, impossible.

In the present arrangement, the arcuate, axially extending and circumferentially spaced lands 16 insures adequate self-threading engagement with a threaded element for holding the parts together; while the corresponding channels 18 provide areas of relief sufficient to reduce the frictional holding tenacity of the material, thereby greatly enhancing the removability characteristics of the device. Accordingly, though three arcuate lands 16 and corresponding number of channels 18 have been illustrated, it is to be understood that any number, size and arrangement of the land and channel construction may be provided to insure optimum self-threading and removability characteristics consistent with the torque requirements for a particular application thereof.

Preferably, the exterior surface of the cylindrical body 4 is provided with a plurality of integral, circumferentially spaced flutes or ribs 22 which extend axially from the head 6. As shown, the ribs 22 are of an inverted V-shaped configuration in cross section (FIG. 2), and are integrally joined to the head 6 by smooth, curved radii 24 to insure flush seating of the head 6 with a support structure. The ribs 22 are provided with inclined, generally planar surfaces 26 which commence generally adjacent their mid-portions and which extend convergently therefrom toward the longitudinal, central axis of the body 4. The inclined surfaces 26 conjunctively provide a generally frustoconical shaped nose at the end of the body 4 remote from the head 6 to facilitate insertion of the device into an apertured work structure. The inclined surfaces 26 of the respective ribs 22 merge into concavo-convex terminal portions 28 adjacent the end of the body 4.

As best shown in FIG. 2, the ribs 22 are preferably eight in number defining an octagonal configuration in end elevation. Preferably, the apexes 30 of alternate and oppositely disposed pairs of ribs 22 preferably lie in common vertical planes disposed at right angles to one another and pass through the longitudinal central axis of the body 4. Such exterior ribbed construction provides ready attachment of the device to an apertured work structure and prevents rotation of the device upon insertion of a threaded element into self-threading engagement with the lands 16, particularly when the work structure is comprised of relatively soft materials, such as wood or the like. In addition, such ribbed construction provides an effective reinforcement and prevents collapse of the relatively thin cylindrical body 4 even under relatively high torque requirements.

Accordingly, though the ribs 22 have been illustrated as being axially extending and of an inverted, generally V-shaped configuration, it is to be understood that they may be radially and/or helically arranged and may be of any other suitable curved or polygonal shape, such as round, square or the like, in accordance with the invention.

In application, the body 4 of the device 2 is simply inserted into an aperture 32 provided in a support structure S until the head 6 is seated flush against the confronting surface, as shown in FIG. 3. In seating the head 6, the ribs 22 may actually cut into the confronting surfaces adjacent the aperture 32 of the support structure S, as at 34, particularly when the structure is comprised of a relatively soft material. This cutting action provides an effective frictional engagement with the support structure S to prevent dislodgment and/or rotational movement of the device upon subsequent installation of the threaded element T. An aperture 36 provided in a panel P may then be aligned with the aperture 32 in the support structure S, whereupon, a threaded element T may then be inserted through the aligned apertures and into the bore 10 of the body 4. The element T may then be turned by means of suitable tool, such as a screwdriver, into self-threading engagement 21 with the respective lands 16 which project radially inwardly from the body 4 until the panel P is drawn into tight abutment against the work structure S. Such self-threading engagement of the element T causes the deformed and/or removed polymeric material of the lands 16 to flow into the area made available by the respective channels 18. Such arrangement effectively locks the device 2 to the element T, but enables the element to "back-off" from threaded engagement with the device when it is desired to detach the assembly. As shown, the threaded element T may project axially beyond the head 6 dependent upon its relative length and/or upon the relative thickness of the work structure. Such projection may be readily cutoff or otherwise removed, as desired.

In some applications, the device 2 may be employed as a nut rather than as a plug type insert. In such cases, the device may be simply attached to the threaded end of a bolt, screw or the like by applying a suitable tool, such as wrench or the like, to the flutes or ribs 22 which provide convenient tool engaging surfaces.

Figure 4:
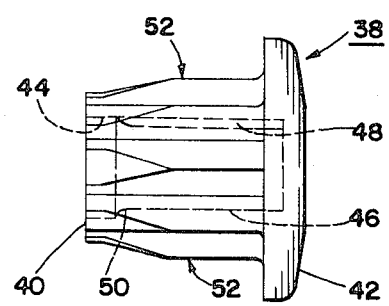
FIG. 4 is a side elevation view of a modification of the fastening device made in accordance with the present invention.
Figure 5:
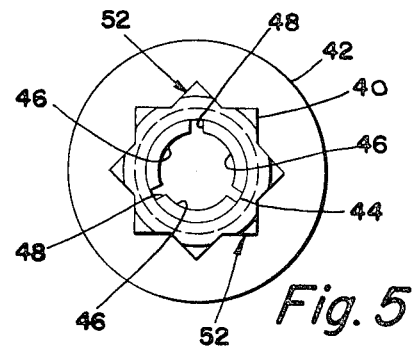
FIG. 5 is an end view looking from the left-hand side of the fastening device shown in FIG. 4.
Figure 6:
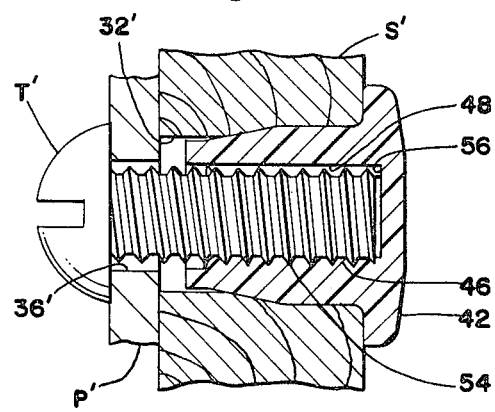
FIG. 6 is a fragmentary section view showing a typical assembly of the fastening device of FIG. 4 for mounting an apertured panel or the like on a support structure.

In FIGS. 4 to 6, there is illustrated a modification of the fastening device, designated generally at 38, which is generally similar to that shown in FIGS. 1 to 3. In this form, the device includes a continuous cylindrical body 40 having an annular flange or head 42 adjacent one end thereof. However, in the embodiment shown, the body 40 is preferably provided with an axial bore 44 which extends from one end, but which terminates at the juncture of the body 40 with the head 42. Moreover, in the form shown, the head 42 is not provided with a tapered countersunk portion which communicates with the axial bore 44.

A plurality of integral, axial extending and circumferentially spaced lands 46 project radially inwardly from the inner peripheral surface of the bore 44 and which define a corresponding number of axially extending, circumferentially spaced channels 48 therebetween. The respective lands 46 similarly commence with smooth, curved shoulders 50 spaced inwardly from the end of the body 40 and terminate at the juncture of the body 40 with the head 42. Moreover, in this form the channels 48 defined by the respective lands 46 also terminate at the juncture of the body 40 with the head 42.

As shown, the exterior of the body 40 is similarly provided with a plurality of circumferentially spaced flutes or ribs 52 of inverted V-shaped configuration which extend axially from the head 42 for the purposes and advantages, as aforesaid.

As shown in FIG. 6, installation of the modification of the fastening device 38 for mounting a work panel P' to a support structure S' is generally similar to that described in connection with FIG. 3. In this form, the threaded element T' is similarly inserted through the aligned apertures 32' and 36' provided in the panel P' and support structure S', respectively, and into the bore 44 provided in the body 40 of the device. Turning movement of the threaded element T' provides self-threading engagement, as at 54, with the adjacent lands 46, whereby any deformed and/or removed polymeric material produced from self-threading is deposited in the relief areas provided by the channels 48. In the embodiment shown, it can be seen, however, that the threaded element T' does not project through the head 42, but terminates adjacent the juncture of the head 42 with the body 40 of the device. By this arrangement, the confronting inner surface 56 of the head 42 provides an effective abutment for limiting further axial movement of the threaded element. Such construction insures against any torqueing of the threaded element relative to the device and obviates any need for removal of the terminal end portion of the threaded element after assembly thereof.

Figure 7:
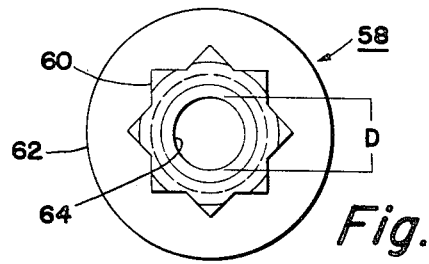
FIG. 7 is an end view of another modification of the fastening device made in accordance with the present invention which may be utilized with the forms shown in FIGS. 1 to 3 and 4 to 6, respectively.

In FIG. 7 there is illustrated an end view of another modification of the device, designated generally at 58, which may be conveniently utilized with the countersunk headed construction of FIGS. 1 to 3 or with the closed headed construction of FIGS. 4 to 6. In this form, however, the device 58 is particularly advantageous when made from polymeric materials which do not exhibit the unusually high toughness and tenacious gripping characteristics of materials, such as polycarbonate or the like. Moreover, in this form, the device is preferably made from a polymeric resin material, such as nylon or the like, which though strong and tough does not exhibit the unusual tenacious gripping characteristics of such materials and which does present the aforementioned difficulties, such as removability or the like, attendant in the application of the device to a threaded element, such as a bolt, screw or the like.

In the embodiment shown, the device 58 incorporates the same identical exterior construction as that described in connection with either FIGS. 1 to 3 or FIGS. 4 to 6 and includes a continuous cylindrical exteriorly ribbed body 60 having an annular head 62 of the countersunk or closed type construction adjacent one end thereof. An axial bore 64 extends from the end of the body 60 remote from the head 62 and projects either into the countersunk portion of the head or terminates adjacent the juncture of the body with the head, as aforesaid. In this form, however, the bore 64 is not provided with the aforementioned land and channel arrangement, but is preferably of a continuous uniform diameter through its length. Preferably, the diameter D of the bore is substantially less than the pitch diameter of a threaded element to which it may be applied to provide the self-threading characteristics on assembly with a threaded element, as aforesaid.

Accordingly, the device 58 in the embodiment shown incorporates the self-threading characteristics for attachment to a threaded element in mounting a panel to an apertured support member. The device 58 being made from a polymeric material, such as nylon, may be quickly and easily "backed-off" from such self-threading engagement, but without the need for the relief construction heretofore described when the device is made from a polymeric material, such as polycarbonate or the like.

Figure 9:
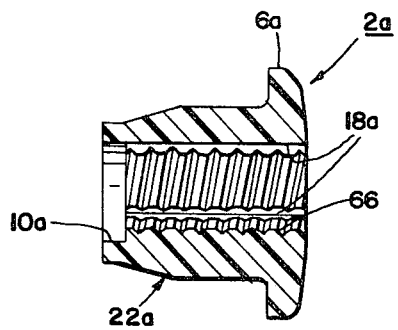
FIG. 9 is a vertical section view taken along the plane of line 9—9 of FIG. 8.
Figure 8:
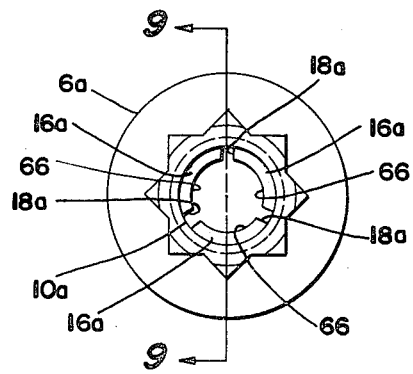
FIG. 8 is an end view of another modification of the fastening device made in accordance with the present invention.

FIGS. 8 and 9 illustrate a modification of the fastening device 2a which is substantially identical to that described in connection with FIGS. 1 to 3, as shown by identical reference numerals with the suffix a added, except that in this form, the axially extending and circumferentially spaced arcuate lands 16a which project radially inwardly from the bore 10a are provided with complementary threads, as at 66, which extend throughout the axial length of the bore 10a. This prethreaded structure is especially advantageous when larger size fastening devices requiring high torque requirements are employed, particularly when the device is made from polymeric materials, such as polycarbonate, whereby the threaded lands 16a provide a maximum holding power on a threaded element inserted into the bore 10a, while the corresponding channels 18a provide adequate areas of relief so as to make disassembly of such threaded element relatively easy.

Figure 11:
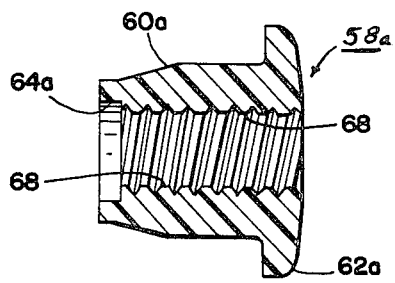
FIG. 11 is a vertical section view taken along the plane of line 11—11 of FIG. 10.
Figure 10:
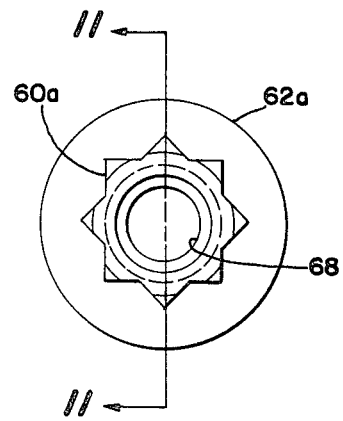
FIG. 10 is an end view of a further modification of the fastening device made in accordance with the present invention.

FIGS. 10 and 11 show a modification of the fastening device 58a which is substantially identical to that described in connection with FIG. 7, as shown by identical reference numerals with the suffix a added, except that the smooth, uninterrupted bore 64a is internally threaded, as at 68, throughout its axial length. The arrangement is similarly advantageous when larger size fastening devices requiring high torque requirements are employed, particularly when the device is made from polymeric materials, such as nylon, as aforesaid.

Figure 12:
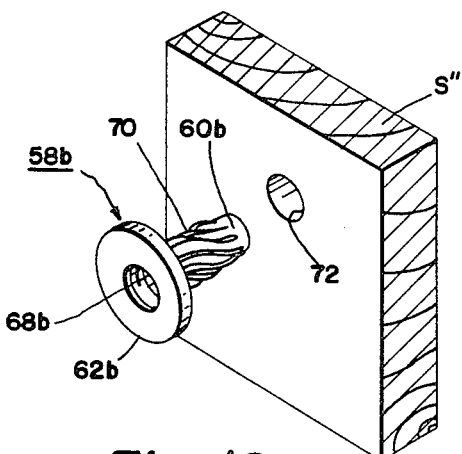
FIG. 12 is a perspective view of still another modification of the fastening device made in accordance with the present invention adapted for insertion into an aperture in a support structure.
Figure 13:
FIG. 13 is an enlarged fragmentary section view of the exterior rib construction of FIG. 12.

In FIGS. 12 and 13, there is shown a fastening device 58b which is similar to that as described in connection with FIGS. 10 and 11, as shown by the same reference numerals with the suffix b applied to identical parts. In this form, however, the exterior surface of the body 60b is provided with a plurality of integral, generally spirally-oriented ribs 70. Such ribs 70 are radially spaced from one another and extend from the head 62b and terminate at points spaced equidistant from the end of the body opposite the head 62b. Preferably, the spirally-oriented ribs 70 are of an inverted generally V-shaped configuration in cross section, as best shown in FIG. 13. This spirally-oriented rib construction provides good self-threading and gripping characteristics when the body 60b of the device is inserted through an aperture 72 provided in a support structure S″, particularly when the support structure is comprised of relatively soft materials, such as wood or other similar fibrous material. In addition, such arrangement enables the device to be quickly disassembled from the support structure without damage to the threaded aperture, whereby the device may again be employed in the same threaded aperture for repeated usage thereof. Accordingly, it will be seen that such spirally-oriented rib construction could also be advantageously employed in lieu of the axially extending rib construction of FIGS. 1 to 6 and 8 to 11 in accordance with the principles of the present invention.

I claim:

1. A fastening device made from a polymeric material comprising, an elongated body, a head attached to one end and projecting radially of said body, said body having a bore extending axially therethrough in a direction from said head for receiving a threaded member therein, a plurality of circumferentially spaced, generally arcuate lands extending axially from said head and projecting radially into said bore, a plurality of circumferentially spaced channels defined by and disposed between said lands and extending axially from said head, each of said lands terminating in a curved shoulder portion which curves smoothly outwardly so as to merge into the confronting surface of said bore, and the points of merger being spaced inwardly from the end of said body remote from said head.

2. A fastening device in accordance with claim 1, including a plurality of ribs disposed on the exterior of said body, said ribs being generally circumferentially spaced and extending generally axially from said head.

3. A fastening device made from a polymeric material comprising, an elongated body, a head attached to and extending radially adjacent one end of said body, said body having a bore extending axially therethrough in a direction from said head and adapted for receiving a threaded member therein, a plurality of axially extending and circumferentially spaced, generally arcuate lands projecting radially inwardly into said bore, a plurality of axially extending and circumferentially spaced channels defined by and disposed between said lands, a plurality of generally circumferentially spaced ribs disposed on the exterior of said body and extending generally axially in a direction from said head, and each of said ribs terminating in an inclined planar portion spaced inwardly a distance from the end of said body remote from said head, wherein each of said lands terminate in a rounded shoulder portion which curves smoothly outwardly so as to merge into the confronting surface of said bore, said points of merge being spaced inwardly from the end of said body remote from said head.

References Cited

UNITED STATES PATENTS

| | | | |
|---|---|---|---|
| 2,088,955 | 8/1937 | Hamill. | |
| 2,172,125 | 9/1939 | Hamill | 85—83 |
| 3,143,916 | 8/1964 | Rice | 151—41.75 |
| 3,255,795 | 6/1966 | Ginsburg | 151—7 |
| 2,908,309 | 10/1959 | Brill | 151—7 |
| 3,030,997 | 4/1962 | Collins | 151—7 |
| 3,280,875 | 10/1966 | Fischer | 85—83 |

FOREIGN PATENTS

| | | |
|---|---|---|
| 253,307 | 5/1962 | Australia. |
| 627,459 | 5/1963 | Belguim. |
| 1,315,418 | 12/1962 | France. |
| 1,354,587 | 1/1964 | France. |
| 894,020 | 4/1962 | Great Britain. |
| 849,602 | 9/1960 | Great Britain. |
| 1,367,208 | 6/1964 | France. |
| 824,748 | 12/1959 | Great Britain. |
| 778,327 | 7/1957 | Great Britain. |

MARION PARSONS, Jr., *Primary Examiner.*

U.S. Cl. X.R.

85—35, 32, 83; 151—7